(12) United States Patent
Kawell et al.

(10) Patent No.: US 7,224,345 B2
(45) Date of Patent: May 29, 2007

(54) PAD COMPUTER

(75) Inventors: Leonard M. Kawell, Concord, MA (US); Mary Ellen Heinen, Concord, MA (US); Patrick M. McGowan, Princeton, MA (US); Alan Ball, Somerville, MA (US)

(73) Assignee: Pepper Computer, Inc., Lexington, MA (US)

( * ) Notice: Subject to any disclaimer, the term of this patent is extended or adjusted under 35 U.S.C. 154(b) by 0 days.

(21) Appl. No.: 10/977,480

(22) Filed: Oct. 29, 2004

(65) Prior Publication Data

US 2005/0156903 A1    Jul. 21, 2005

Related U.S. Application Data

(60) Provisional application No. 60/515,753, filed on Oct. 30, 2003.

(51) Int. Cl.
G09G 5/00    (2006.01)
(52) U.S. Cl. ........................... 345/169; 345/168
(58) Field of Classification Search ............... 345/156, 345/168, 169; 361/679–681; D14/333–335, D14/338–340
See application file for complete search history.

(56) References Cited

U.S. PATENT DOCUMENTS

| D346,366 | S | 4/1994 | Kim et al. |
| D363,468 | S | 10/1995 | Mieki et al. |
| 5,644,338 | A | 7/1997 | Bowen |
| 5,661,632 | A * | 8/1997 | Register ............... 361/683 |
| 5,703,626 | A * | 12/1997 | Itoh et al. ............ 345/173 |
| D445,418 | S | 7/2001 | Chen |
| 6,278,442 | B1 * | 8/2001 | Griffin et al. ........... 345/169 |
| D449,044 | S | 10/2001 | Prichard |
| 6,297,752 | B1 | 10/2001 | Ni |
| D451,505 | S | 12/2001 | Iseki et al. |
| D453,149 | S | 1/2002 | Skoger et al. |
| 6,434,403 | B1 * | 8/2002 | Ausems et al. ......... 455/556.2 |
| 6,580,932 | B1 | 6/2003 | Finke-Anlauff |
| 6,628,508 | B2 * | 9/2003 | Lieu et al. ............ 361/680 |
| 6,628,511 | B2 * | 9/2003 | Engstrom ............. 361/683 |
| D483,361 | S | 12/2003 | Yao et al. |
| D487,742 | S | 3/2004 | Huang et al. |
| D487,891 | S | 3/2004 | Yang et al. |

(Continued)

FOREIGN PATENT DOCUMENTS

JP    2000-267787    9/2000

OTHER PUBLICATIONS

U.S. Appl. No. 29/192,829, filed Oct. 30, 2003, Ball.

(Continued)

*Primary Examiner*—Ricardo Osorio
(74) *Attorney, Agent, or Firm*—Wilmer Cutler Pickering Hale and Dorr LLP

(57) ABSTRACT

A computers can include a high-resolution color display, built-in keypad, wireless LAN connection, hi-fidelity audio system, and a multi-gigabyte disk drive. The screen can be formed in a top face of a computer and a keypad can be a split on opposite sides of the screen. The computer can also have various other controls and features, including function keys, scroll wheel, game D-pad, stylus, and fingerprint reader. Speaker covers for built-in speakers can be provided in the top face.

33 Claims, 4 Drawing Sheets

U.S. PATENT DOCUMENTS

| | | | |
|---|---|---|---|
| 6,711,419 B1* | 3/2004 | Mori | 455/556.1 |
| D488,465 S | 4/2004 | Gartrell et al. | |
| D490,420 S | 5/2004 | Solomon et al. | |
| 6,801,796 B2* | 10/2004 | Finke-Anlauff | 455/575.3 |
| 2003/0002007 A1* | 1/2003 | Meringer | 349/169 |
| 2003/0078069 A1* | 4/2003 | Lindeman | 455/550 |
| 2005/0033603 A1* | 2/2005 | Suzuki et al. | 705/2 |
| 2006/0002072 A1 | 1/2006 | Sutton et al | |

OTHER PUBLICATIONS

U.S. Appl. No. 29/209,316, filed Jul. 14, 2004, Ball.

* cited by examiner

PAD COMPUTER

CROSS-REFERENCE TO RELATED APPLICATION

This application claims priority from Provisional Application Ser. No. 60/515,753, filed Oct. 30, 2003, which is incorporated herein by reference.

BACKGROUND

Computers can come in a variety of sizes and configurations, from large desktop units to laptops to smaller sizes. Personal digital assistants (PDAs) and other smaller devices also can have much of the functionality of computers. Computers have various configurations of screens, keys, and other features.

SUMMARY

The computers described here can be smaller than a currently conventional laptop computers, but can have about any size. They can also include many useful features, including a high-resolution color display, built-in keypad, wireless LAN connection, hi-fidelity audio system, and a multi-gigabyte disk drive. The keypad can be a split keypad on opposite sides of a screen formed in a top face of a computer. The computer can also have various other controls and features, including function keys, scroll wheel, game D-pad, stylus, and fingerprint reader. Speakers can also be built into the top face.

The computers as described can be self-contained and could be a user's only computer, usable for processes such as for researching and writing school assignments, drawing, painting, online shopping, reading news, chatting, e-mail, listening to music, and watching movies.

DETAILED DESCRIPTION

Figure 1:
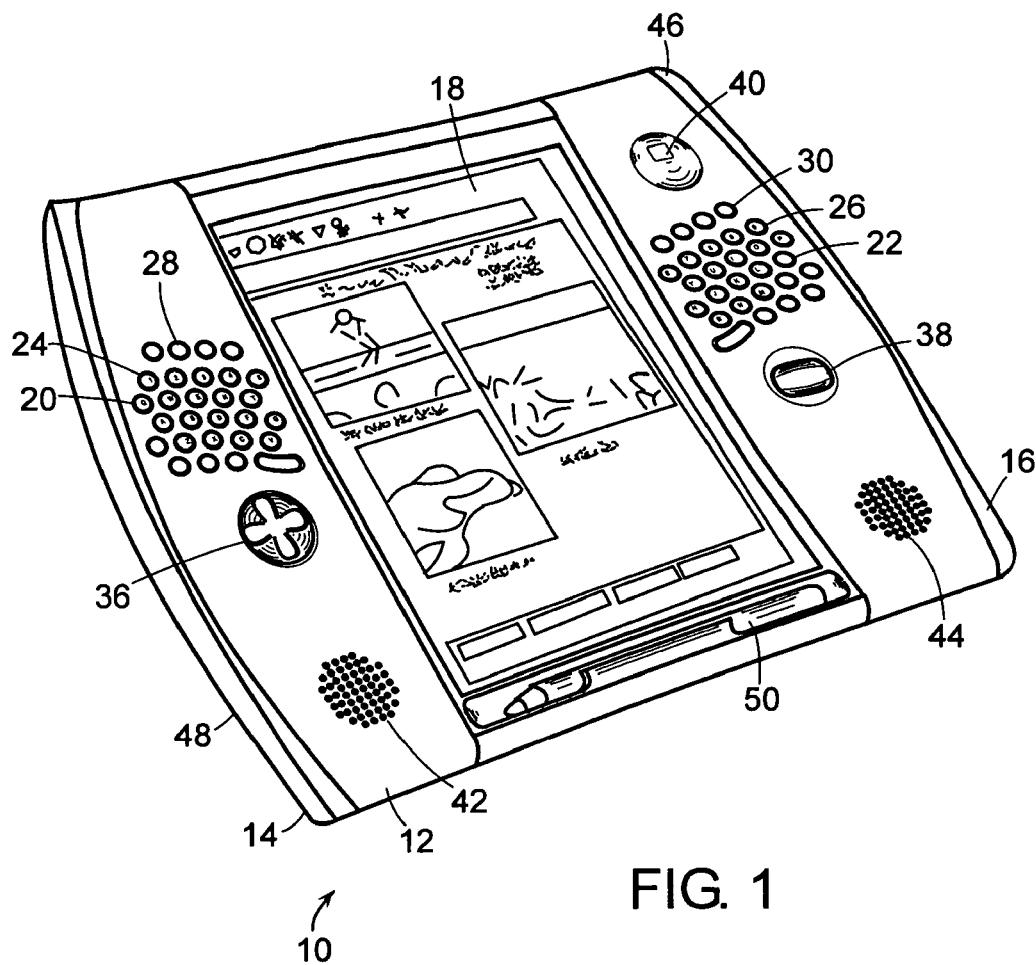
FIG. 1 is a perspective view of a computer.

Referring to FIG. 1, a computer 10 has a housing 12 with bumpers 14, 16 around the edges to give the housing a rugged look and to provide shock protection. The housing has a top face and an LCD screen 18 formed in the top face. LCD screen 18 can be provided in portrait orientation as shown here and in application no. 29/192,829, filed Oct. 30, 2003, or in a landscape orientation, as also shown in application no. 29/209,316, filed Jul. 14, 2004 (both of these design patent applications are incorporated herein by reference). The screen has a cold cathode fluorescent lamp (CCFL) backlight with an inverter. Screen 18 can be laterally centered in the housing and can extend for most of the vertical dimension of the housing. The screen can be a resistive 4-wire touch screen. The housing can be made of smooth bright-colored plastic and/or metal.

The computer can have a fold-over cover (not shown) to protect the LCD screen. The cover can screw onto the housing but is customer-replaceable. The cover can be made with a user's choice of materials: metal, plastic, rubber, spandex, leather, etc. The cover is convenient to use, ensuring it is used regularly to protect the LCD. Users can have a whole collection of covers that they pop on and off to suit their mood or fashion.

Figure 2:
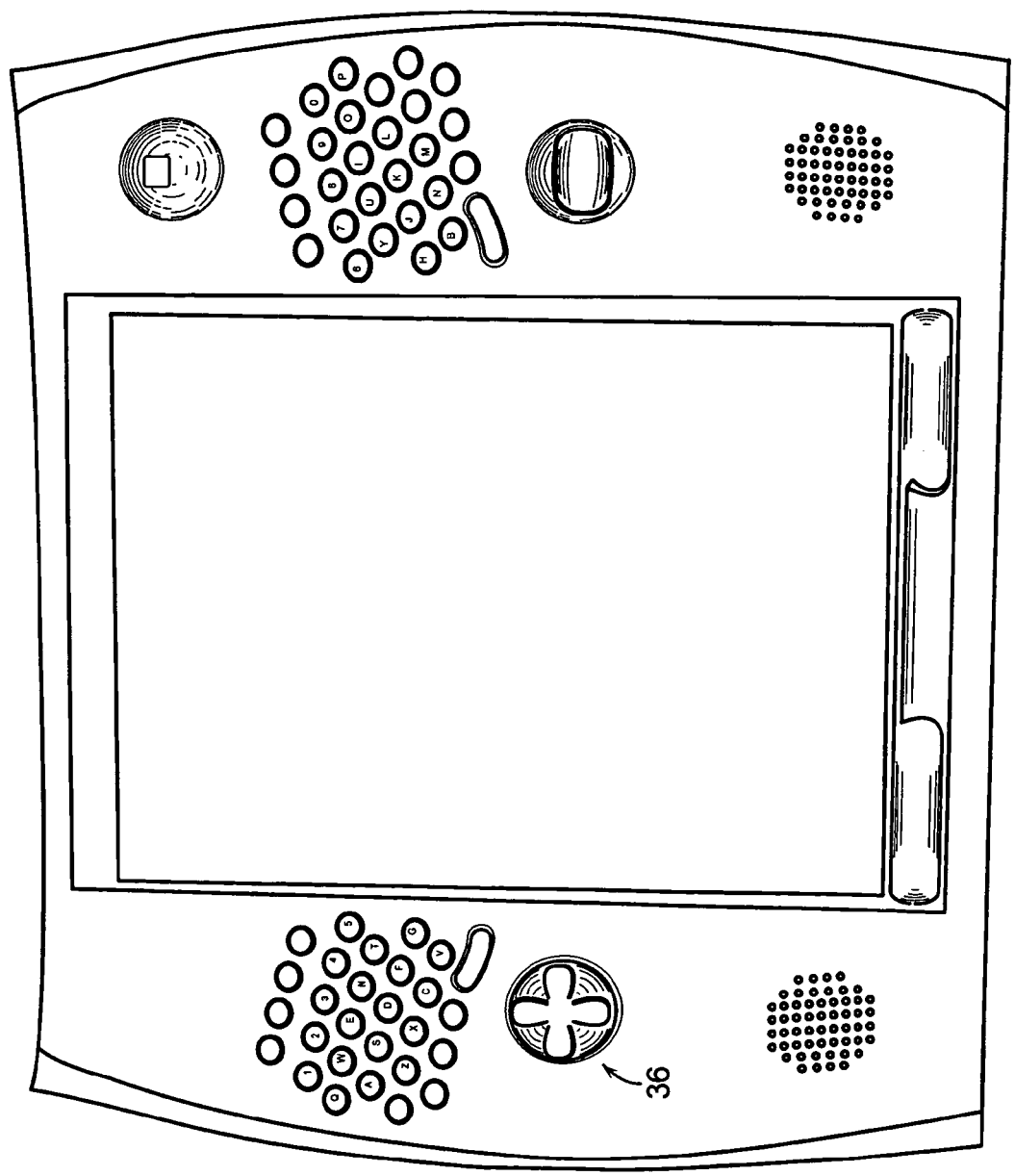
FIG. 2 is a plan view of the computer of FIG. 1.
Figure 3:
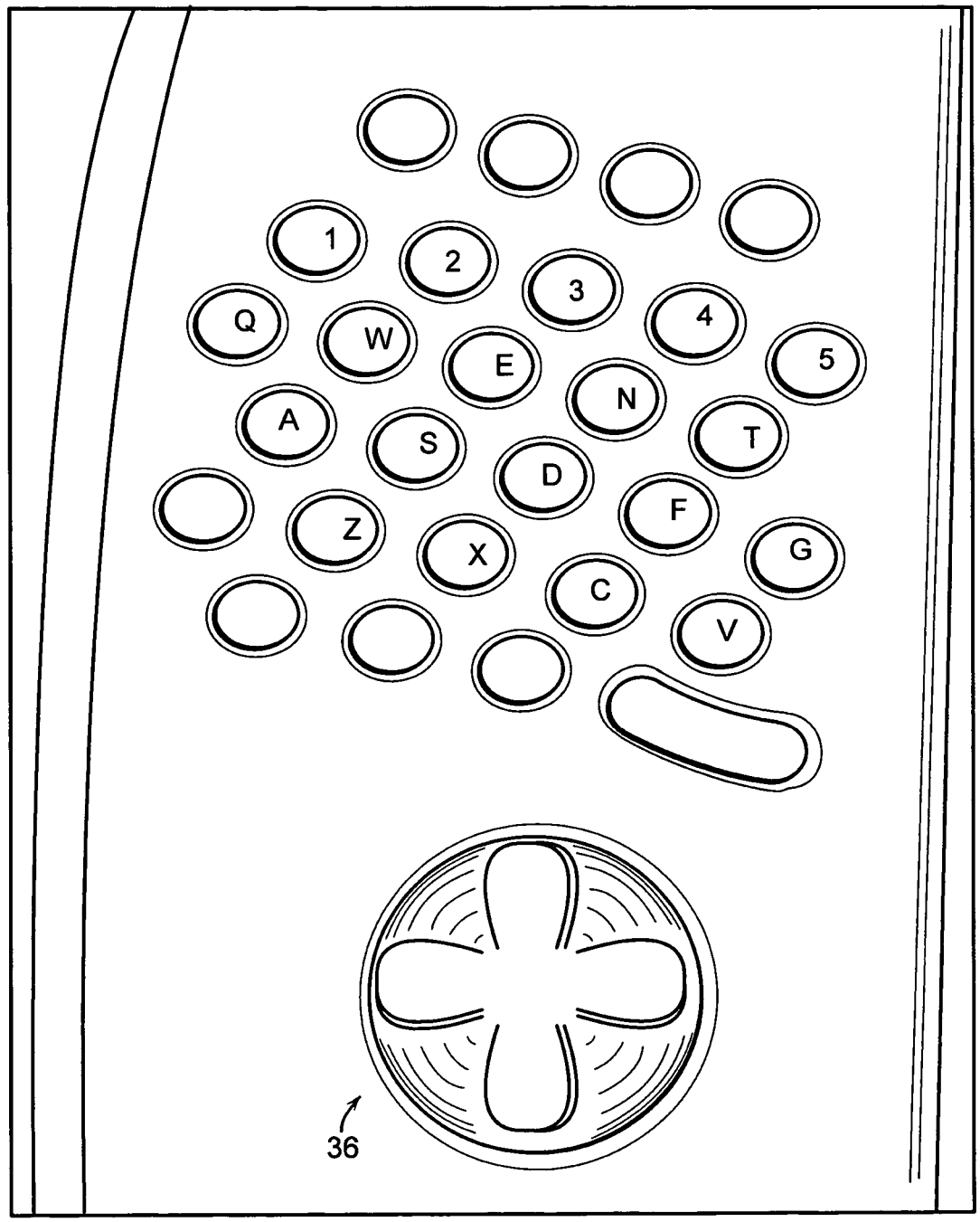
FIGS. 3 and 4 are close-up views of portions of the computer shown in FIGS. 1 and 2.
Figure 4:
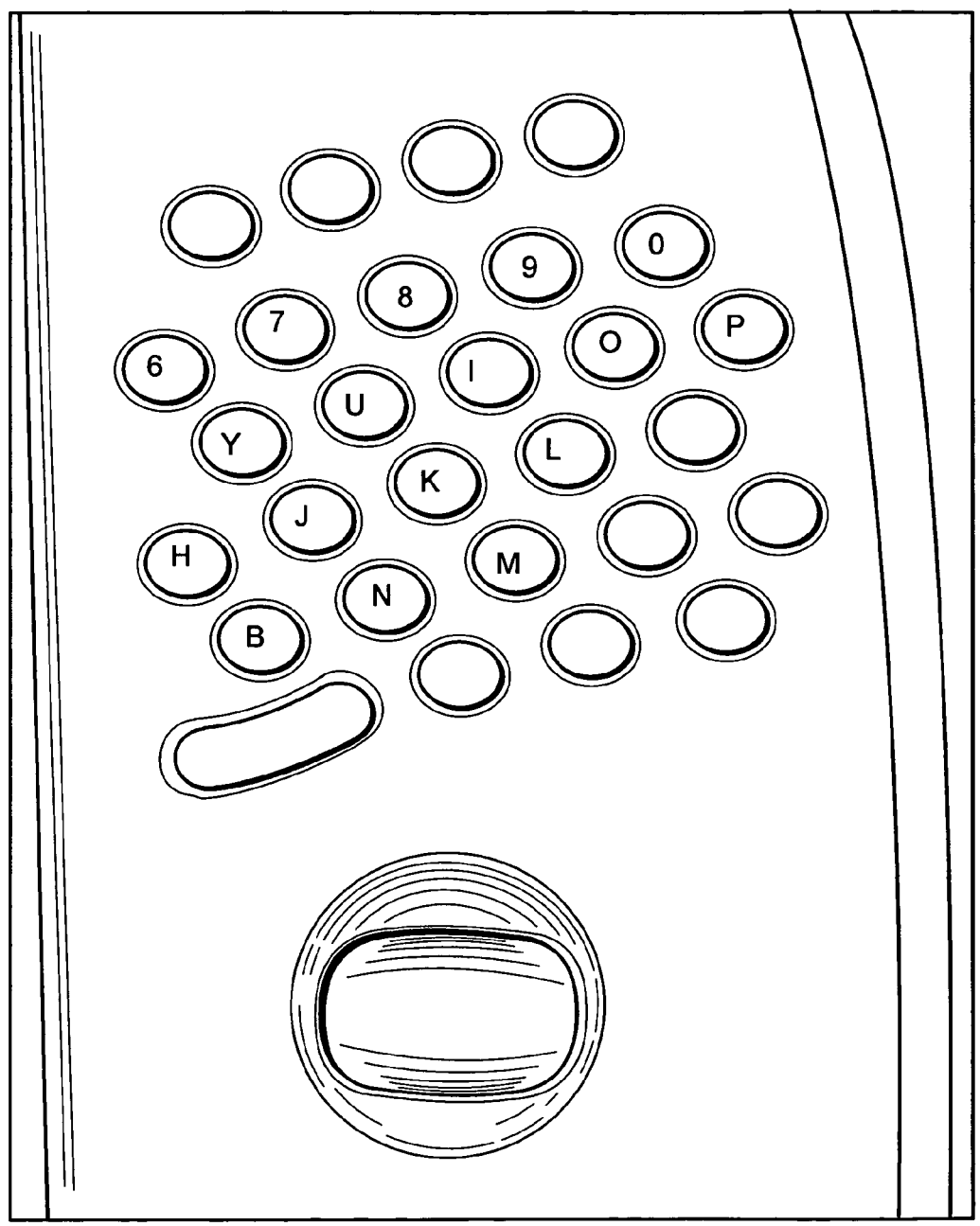

As also shown in FIG. 2, the computer is balanced so it rests easily in the user's hands when using a built-in keyboard or and does not readily tip when using a stand. The keypad is in the top face of the housing and preferably has a full QWERTY keyboard plus function keys. As also shown in FIGS. 2–4, the keypad can be split to include a left keypad 20 between a left edge of the screen and a left edge of the housing, and a right keypad 22 between the right edge of the screen and the right edge of the housing, and thus on opposite sides of the screen. General purpose function keys 24, 26 can be provided on one or both sides, and specific function keys 28 and 30 can be provided on each side for music control, screen brightness, volume control, or other controls.

The computer controls can also include a game controller-style direction pad (D-Pad) 36, a thumbwheel 38 that is easily accessible when using the built-in keyboard, and can include a fingerprint reader 40 (including, for example, a thumbprint), or may have some other biological detector for detecting the presence of a particular user to allow use of the computer by that user. Such a detector is not necessary, and other protections, such as password protection, could be used. The computer could also be shared among multiple users, such as in an educational environment, in which case the computer can sense the user biologically and automatically configure itself for the particular sensed user, or configure in one of a number of ways for one of a group of users.

The computer housing can be designed to be water and grit resistant, meaning that an occasional splash of water or soft drink will not seep into the case and ruin the electronics. Using it at the beach or pool is possible, though it may not necessarily survive a full dunking. The LCD and keyboard have basic rubber gaskets and any external openings for jacks are covered with rubber plugs.

While a keypad and touch screen are preferably built-in, an optional full-size keyboard and mouse can connect wirelessly via Bluetooth technology. Internet and LAN connectivity is preferably wireless via built-in WiFi (802.11b). Printers can also be connected wirelessly via either Bluetooth or WiFi. For compatibility with existing wired devices, such as cameras, scanners, and printers, a USB port (e.g., 1.1) is also provided.

The top face of the housing can also include one or more covers for speakers 42, 44. Additional outlets can be provided for a card slot 46 and a headphone jack 48.

A stylus holder 50 for holding a stylus can also be provided in the top face of the computer.

The computer preferably does not have any external antennas or other dangling parts that can break off if treated roughly.

One set of exemplary dimensions is approximately 10" in length, 9.3" wide, and less than 1" thick, e.g., about 0.8" thick. It is designed to be durable, and able to survive being dropped on the floor, tossed in a backpack, and splashed. Other dimensions are possible, but it is preferably smaller than a typical current laptop, but larger than a PDA.

The computer preferably runs on the Linux operating system and Java, and should be reliable and secure. The Java run-time environment is designed to allow users to download and run dozens of programs.

The environment should also be private—the information on the computer can be encrypted and it is preferably unlocked only when a test is met, such as the owner's thumbprint.

The computer is designed to use low-cost, low-power components. Since long battery life (at least 8 hours) is desired, the system is designed to power on and off components as needed.

The system can include a WiFi/802.11b PC card with housing-mounted diversity antennas, Bluetooth wireless radio chip with embedded ROM connected via dedicated interface, a shock-mounted PC card disk drive, audio CODEC, audio amp, built-in stereo speakers and microphone, mini stereo headphone, and microphone jacks (some of which are shown above).

Further components that can be added or provided include FM Radio, WiFi wireless LAN chipset, disk drive, digital camera module and connector with custom FPGA controller, built-in or snap-in power adapter/charger, compact Flash Card slot, V.90 modem and RJ-11 jack, analog joystick, and additional function buttons (e.g., more game controller buttons).

A slot-loading CD-RW/DVD that optionally snaps on the back of the computer can be provided. The CD/DVD backpack can be added or removed without powering down the computer, so it should use a plug & play interface, such as USB. The backpack may also require an additional internal battery to ensure at least 2 hours of DVD playing time.

The angle and curve of the housing and the angle of the keypads relative to the edges of the housing are useful for the feel and ergonomics of the computer, in addition to providing an attractive and ornamental appearance. The lateral sides are preferable bowed outwardly (concave) and the top and bottom sides are bowed inwardly (convex). By splitting the keypad and locating it in the upper half of the housing at the proper position in the curve, the computer remains balanced in the user's hands while the user is typing, scrolling, or gaming.

The computer is preferably built from a two-piece injection molded and machined plastic housing. The two front side panels are covered with customer-replaceable and customizable faceplates. The edges of the housing can include soft elastomeric plastic grips that also protect the edges of the housing. The LCD is also protected with an elastomeric bezel.

Many details are provide but numerous modifications can be made. It is expected that improvements will be made with future hardware as it becomes available. In addition, not all the components set out above are needed; for example, the keyboard could have fewer keys, certain interfaces and ports could be omitted, and other changes could be made that could add features, or reduce features and cost.

What is claimed is:

1. A computer comprising a housing for enclosing a microprocessor, the housing having a top face, a left side, and a right side, said top face having an upper half and a lower half, and including a screen in the top face, the screen positioned between the left and right sides to define a first region between the left side and the screen, and a second region between the right edge and the screen, the system including a built-in QWERTY key board in the top face with at least some of the QWERTY keys in the first region and some of the QWERTY keys in the second region, wherein the QWERTY key board is completely located within the upper half of the top face, and wherein the top face is of unitary construction such that the first and second regions of the top face are fixed relative to each other.

2. The computer of claim 1, further comprising a stylus with a stylus holder located below the screen.

3. The computer of claim 1, further comprising a thumb wheel located in one of the first and second regions.

4. The computer of claim 1, further comprising function keys with some in each of the first and second regions.

5. The computer of claim 1, further comprising speaker covers in the top face for covering built in speakers with openings for sound.

6. The computer of claim 1, further comprising means for detecting a particular individual.

7. The computer of claim 6, wherein the detecting means includes a fingerprint reader.

8. The computer of claim 1, further comprising directional arrows formed in the top face of the housing.

9. The computer of claim 1, further comprising a hard drive.

10. The computer of claim 1, wherein the screen is a touch screen.

11. The computer of claim 1, further comprising a stylus holder formed in the top face of the housing.

12. The computer of claim 1, wherein the screen has a portrait orientation.

13. The computer of claim 1, wherein the screen has a landscape orientation.

14. The computer of claim 1, the top face having a right half and a left half, wherein the QWERTY keys in the first region have rows of keys having an orientation at an acute angle relative to a line dividing the right half from the left half, and wherein the QWERTY keys in the second region have rows of keys having an orientation corresponding to the orientation of the QWERTY keys in the first region but reflected across said line.

15. The computer of claim 1, wherein the right and left sides have a length, wherein the top face has a width, and wherein the length of the right and left sides is greater than the width of the top face.

16. The computer of claim 1, further comprising a color display, at least one additional input device, and a disk drive.

17. The computer of claim 1, wherein the housing does not fold over itself.

18. The computer of claim 16, wherein the disk drive comprises a multi-gigabyte disk drive.

19. The computer of claim 16, wherein at least one side has a dimension of about 9–10 inches.

20. The computer of claim 16, further including a wireless LAN chipset.

21. The computer of claim 16, further including a Bluetooth wireless radio chip.

22. The computer of claim 16, further including at least one of a hi-fidelity audio system, FM radio, digital camera module, compact flash card slot, USB slot, modem and jack, slot-loading CD-RW/DVD, and headphone jack.

23. The computer of claim 16, the top face having a right half and a left half, wherein the QWERTY keys in the first region have rows of keys having an orientation at an acute angle relative to a line dividing the right half from the left half, and wherein the QWERTY keys in the second region have rows of keys having an orientation corresponding to the orientation of the QWERTY keys in the first region but reflected across said line.

24. The computer of claim 1, wherein the left and right sides are bowed outwardly.

25. The computer of claim 24, wherein the computer has a top side and a bottom side, and wherein the top side and a bottom side are bowed inwardly.

26. The computer of claim 1, wherein the computer has a top side and a bottom side, and wherein the top side and a bottom side are bowed inwardly.

27. The computer of claim 1, wherein the housing comprises two pieces of injection molded and machined plastic.

28. The computer of claim 1, wherein the top face surrounds the screen.

29. A computer comprising a housing with a top face, a left side, and a right side, and a screen extending for most of the vertical direction of the top face, and further including a built-in QWERTY key board in the top face, wherein the QWERTY key board has some keys between the left side and the screen, and other keys between the right side and the screen, said top face having an upper half and a lower half, wherein the QWERTY key board is completely located within the upper half of the top face, and wherein the top face is of unitary construction such that left and right sides are fixed relative to each other.

30. The computer of claim 29, wherein computer further includes, in the top face, at least one of the following: a stylus, a D-pad, and a scroll.

31. The computer of claim 29, wherein the screen has a portrait orientation.

32. The computer of claim 29, wherein the screen has a landscape orientation.

33. The computer of claim 29, the top face having a right half and a left half, wherein the QWERTY keys in the first region have rows of keys having an orientation at an acute angle relative to a line dividing the right half from the left half, and wherein the QWERTY keys in the second region have rows of keys having an orientation corresponding to the orientation of the QWERTY keys in the first region but reflected across said line.

* * * * *